United States Patent [19]
Williams

[11] Patent Number: 5,870,853
[45] Date of Patent: Feb. 16, 1999

[54] SEALABLE BAITING DEVICE

[75] Inventor: Jerry L. Williams, Lamar County, Tex.

[73] Assignee: Kness Mfg. Co., Inc., Albia, Iowa

[21] Appl. No.: 901,807

[22] Filed: Jul. 28, 1997

[51] Int. Cl.⁶ .................................................. A01M 1/20
[52] U.S. Cl. ............................................ 43/131; 43/132.1
[58] Field of Search ................................ 43/131, 132.1; 111/7.2

[56] References Cited

U.S. PATENT DOCUMENTS

| | | |
|---|---|---|
| 478,691 | 7/1892 | De Shon . |
| 1,729,389 | 9/1929 | Hughett . |
| 1,748,449 | 2/1930 | Hughett . |
| 1,804,426 | 5/1931 | Mattes . |
| 1,991,547 | 2/1935 | Deford ...................................... 43/131 |
| 2,082,712 | 6/1937 | McIvor ...................................... 43/131 |
| 2,176,345 | 10/1939 | Hurwitt ...................................... 43/131 |
| 2,837,861 | 7/1958 | Graham, Sr. .............................. 43/131 |
| 3,040,470 | 6/1962 | Kanin ........................................ 43/131 |
| 4,065,872 | 1/1978 | Patton et al. .............................. 43/131 |
| 4,413,440 | 11/1983 | Schultz ................................ 43/131 X |
| 4,485,582 | 12/1984 | Morris ....................................... 43/131 |
| 5,528,854 | 6/1996 | Antonali et al. .......................... 43/131 |
| 5,746,021 | 5/1998 | Green ........................................ 43/131 |

*Primary Examiner*—Robert P. Swiatek
*Attorney, Agent, or Firm*—Zarley, McKee, Thomte, Voorhees & Sease

[57] ABSTRACT

The baiting device of the present invention acts to provide a device for exposing ants or other crawling insects to bait without allowing the bait to become dampened or blown away and while protecting small animals or children from eating the bait. The preferred ant bait or insect killer is placed within the sealed container. The lid of the container is locked into place by a fastener to a cap on top of the pipe so that the lid is not easily removed by animals or children. The baiting device is then stuck into the ground like a stake near the ant bed under attack. Because there is an open airway through the pipe to the bait within the container, the bait may be smelled by ants and other insects which may enter the container and remove bait through the holes in the pipe. The bait is protected within the container from exposure to the weather and other outside forces, as well as being sealed away from pets and children. In the preferred embodiment the level of bait remaining in the device may be monitored through the clear sides of the container.

11 Claims, 6 Drawing Sheets

SEALABLE BAITING DEVICE

BACKGROUND

In the battle against crawling insects, one of the most popular and effective weapons is the use of bait which is taken by the insects back to the insects' home where more complete exposure or exposure to key insects (i.e. a queen) can occur. Baits are commonly spread around, near, or on the surface of the home of the insects or near or in an area where the insects are gathering food. Exposure to outside elements, however, can reduce the life and/or effectiveness of bait as it is washed away, diluted, dissolved, blown away, etc. Further, children, household pets, and livestock may also get into the bait, creating potential risks for themselves, as well as again damaging the life and/or effectiveness of the bait. Various patents have been issued in the past on devices providing some form of container device for baiting insects.

U.S. Pat. No. 4,485,582 to Morris discloses a container with openings in its outer surface mounted on a hollow extension or stem. The container portion has an inner wall with openings offset from those in the outer wall and an inner floor with openings offset from the opening of the hollow stem into the container. The bait is placed in the inner compartment formed by the inner floor and inner walls. Insects may enter through the openings in the container itself or theoretically from the bottom of the stem which has been inserted into the ground. There are no other openings in the stem. The cover of the container is optionally partially transparent, which, combined with the use of a contrasting color for the floor of the bait compartment, allows an easier view of the amount of bait used.

U.S. Pat. No. 1,991,547 to Deford discloses a container which is essentially a metal stake with openings. The stake may be stuck in the ground or other location or hung from an appropriate spot. The stake includes a hollow middle section, covered on top and bottom by cap portions, which acts as a container. The bait is placed within the container and may be accessed by the insects through openings in the container itself.

U.S. Pat. No. 4,065,872 to Patton et al. discloses a stake with corrugations which is to be inserted into the ground. A cup with an aperture is snapped over a recess in the stake to create a container for the bait or poison. Insects access the bait through openings in the container itself. Additionally, when used outside, the corrugations will accumulate poison bait as it is partially solubilized by water worldling its way into the container and carrying part of the bait out of the container into the corrugations.

All of the preceding baiting devices rely on holes in the container itself to provide insects access to the bait within the container. The prior art devices rely on a secondary wall system or on the size of the holes themselves to prevent children and pets from getting to the bait. These same methods are also all that the devices rely on to prevent rain or the elements from affecting the bait stored within.

SUMMARY OF THE INVENTION

The baiting device of the present invention comprises the following components:

(1) a hollow piece of pipe or tubing (cylindrical or otherwise shaped) with a series of holes drilled into it to allow ants or other insects access to the hollow inside of the tube;

(2) a container with a sealable top which is mounted around the top portion of the hollow pipe with the top or lid of the container acting to assist in connecting to and closing the top of the pipe and the bottom of the container containing an aperture through which the pipe passes with a relatively tight fit;

(3) the series of holes are positioned such that there are holes in the pipe which are not covered by the container and holes within the area covered by the container, allowing ants and other insects to enter the station from outside, pass through the pipe, and enter the area contained within and protected by the container, and leave in similar fashion.

The baiting device of the present invention acts to provide a means for exposing ants (or other crawling insects) to bait without allowing the bait to become dampened or blown away and while protecting other animals (e.g., household pets) from eating the bait. The preferred ant bait or insect killer is placed within the sealed container. The lid of the container (or cap or other sealing element) is locked into place by a fastener (a screw in the preferred embodiment) to a cap or plug on top of the pipe so that the lid is not easily removed by animals or children. The baiting device is then stuck into the ground like a stake near the ant bed under attack. In an alternative embodiment, a plug is placed within the hollow core to prevent dirt from rising up through the core to block the access holes when the baiting device is staked into the ground. Because there is an open airway through the pipe to the bait within the container, the bait may be smelled by ants and other insects which may enter the container and remove bait through the holes in the pipe. The bait is protected within the container from exposure to the weather and other outside forces, as well as being sealed away from pets and children. In the preferred embodiment the level of bait remaining in the container may be monitored through the clear sides of the container allowing for easy checking and verification.

DETAILED DESCRIPTON

Figure 1:
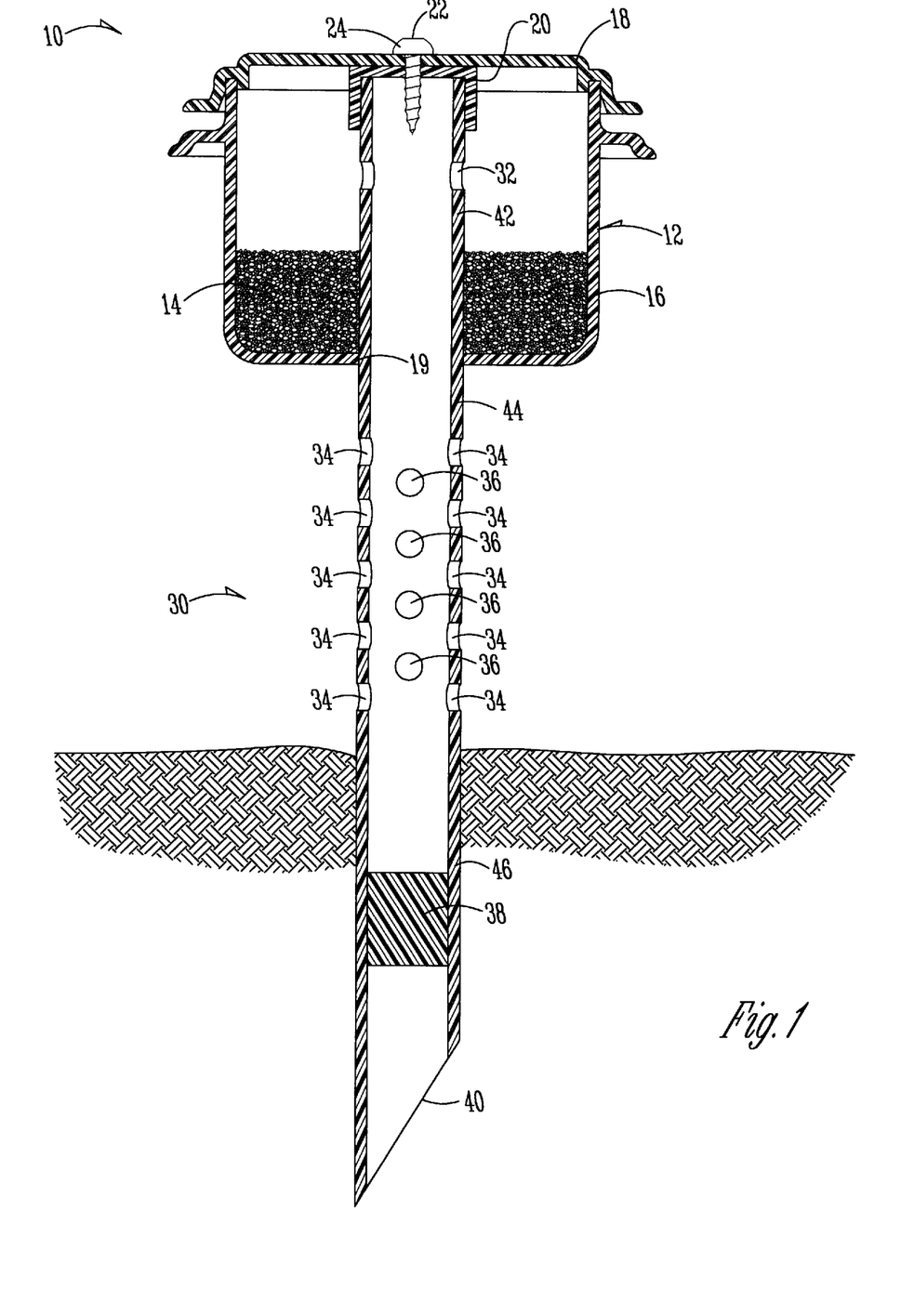
FIG. 1 is a cut-away view of an alternative embodiment of the baiting device inserted in the ground with bait in place.
Figure 2:
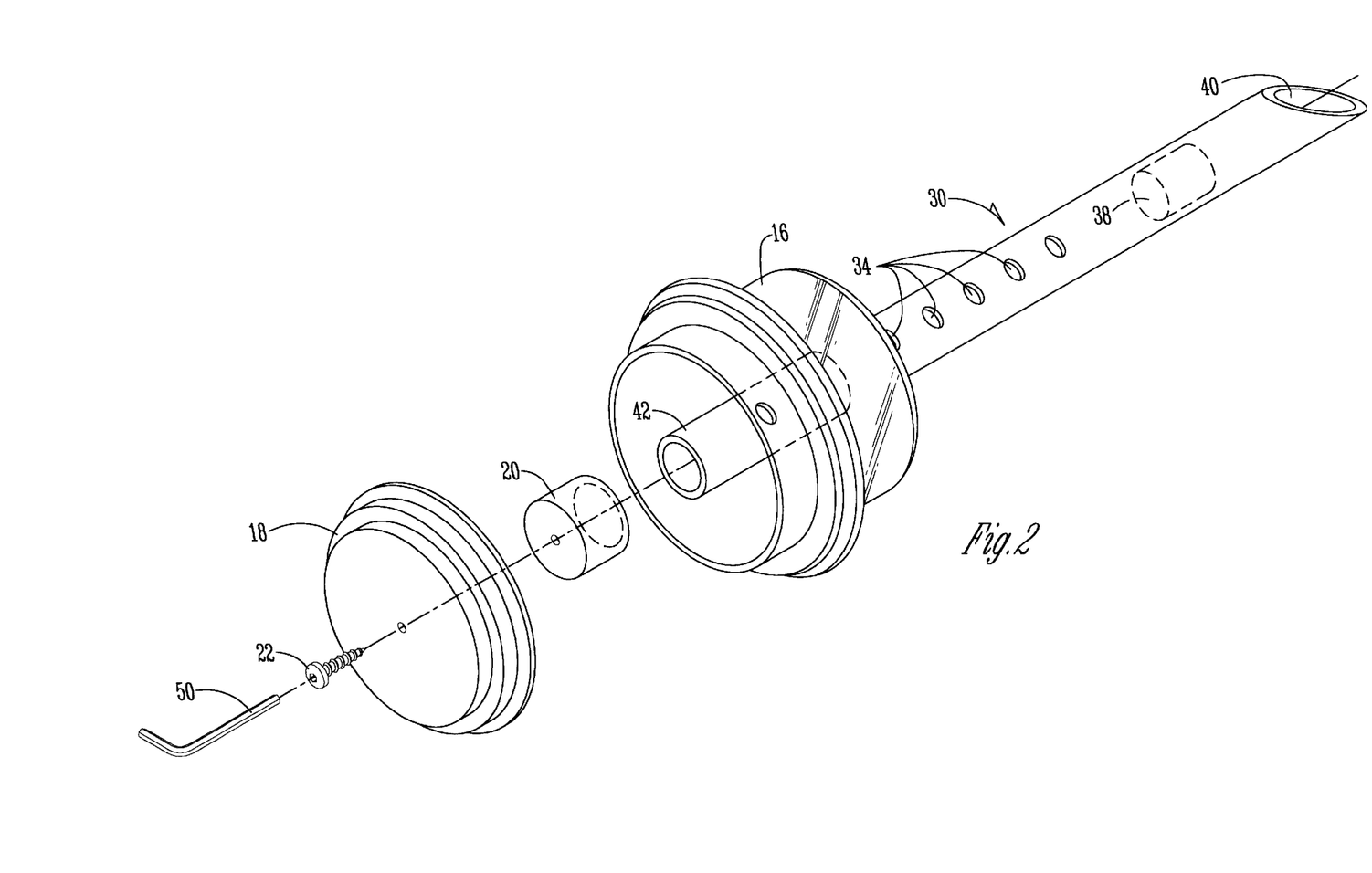
FIG. 2 is an exploded view of an alternative embodiment of the baiting device with the lid and cap disassembled.

In order to illustrate the embodiments and best mode of the system and method, the following is a detailed description of a more complex alternative embodiment of baiting device 10 as illustrated in FIGS. 1 & 2, and of the simpler preferred embodiment of baiting device 10 as shown by FIGS. 3–9.

FIG. 1 is a cut-away view of the more complex embodiment of baiting device 10 of the present invention. Baiting device 10 consists of two major components: container 12 and stem 30. Container 12 is used to hold and protect bait 14 while mounted upon stem 30 which provides support, elevation, and access to the inside of container 12.

Container 12 has two major components: container body 16 and lid 18. Container body 16 constitutes the main portion of container 12, and may be considered the container itself. Container body 16 has an opening 19 which, in the assembled condition, is filled by stem 30. Once assembled, stem 30, may be permanently affixed within opening 19 and which may also be sealed around stem 30 as a part of the affixing process or independently. Container body 16 also has an open top which is covered by resealable lid 18 which snaps into place creating a seal. In alternative embodiments, lid 18 could sealably attach in other manners such as through the use of threads etc, and as such, lid 18 could constitute a cap, plug, cover, or other sealing member. In its covered and sealed position, wind, rain, and other elements of the neighboring environment have no direct access to bait 14 inside of container 12. In the preferred embodiment, container 12 is a generally cylindrical plastic container which has transparent or translucent walls with a solid color resealable lid 18. The most preferred embodiment is a resealable food container for maintaining the freshness of stored food such as that produced and sold under the mark Rubbermaid (tm).

Stem 30 is made up of three portions, the upper portion 42, the lower portion 44, and the grounded portion 46. Grounded portion 46 may be considered a subset of lower portion 44. Stem 30 is a tube or pipe with a hollow interior (also referred to as an interior chamber). In the preferred embodiment, stem 30 is a piece of pvc piping with about ½ inch diameter. Stem 30 does not have to be cylindrically shaped tube or pipe (or even other shapes of tube or pipe), so long as it is a hollow member which may act as a conduit and which may also be staked into the ground (for example, stem 30 could have a rectangular or triangular profile instead of the preferred circular profile).

When assembled, stem 30 has a plug or cap 20 affixed to the top of stem 30, closing off the hollow interior. Cap 20 is also the point used to lock into place resealable lid 18 and serves as a surface to support container 12 by supporting lid 18. In the preferred embodiment resealable lid 18 is locked into its sealed position through the use of a fastener 22, preferably a screw (if a more securely locking method of sealably attaching lid 18 is used (such as threads) an additional fastener will be less useful). In an alternative embodiment, a washer 24 may be used in between the head of fastener 22 and resealable lid 18. In the preferred embodiment, washer 24 is not present, as the flexibility of plastic lid 18 is sufficient to create a reasonably good seal. Fastener 22 passes through resealable lid 18 and through cap 20 to lock resealable lid 18 in place, making it more difficult for accidental removal of lid 18 by small children or by other factors in the environment.

Upper portion 42 is that portion of stem 30 contained within container 12. In the disclosed embodiment, upper portion 42 has a pair of apertures 32 which provide communication between the inside of container 12 and the hollow interior of stem 30. By providing "communication", apertures 32 provide access between two areas to air, other fluids, and small crawling insects. As illustrated in FIG. 1, apertures 32 are set at a level above the level of bait 14, so that the bait does not slip through the apertures into the hollow interior of stem 30. In an alternative embodiment, some bait may be allowed to slip into the hollow interior and rest at the very bottom of stem 30 providing additional bait for access by ants or other crawling insects. However, this alternative embodiment loses some of the advantages of the present invention as the bait within the hollow interior of stem 30 would be in relatively close contact with the outside environment with easier access by moisture from rain, for example.

Apertures 32 are shown as a pair of apertures, where a pair constitutes two apertures at or about approximately the same height. Further, apertures 32 are an opposing pair of apertures where an opposing pair are 180° apart from each other on the stem 30. There could also be two opposing pair of apertures 32 where one opposing pair was offset 90° from the other opposing pair. While the preferred embodiment has an opposing pair of apertures 32, one skilled in the art will recognize that so long as at least one aperture 32 is present, additional apertures 32 would not be required. Further, while an opposing pair of apertures 32 provides conveniences in manufacture as, for example a drill may be put straight through stem 30 creating both of the pair at the same time, while improving efficiency and cost of construction this is not a requirement for successful practice of the baiting device.

Lower portion 44 of stem 30 constitutes that portion of stem 30 which is outside of container 12. Lower portion 44 contains a plurality of apertures 34 and 36 providing communication between the neighboring environment and the hollow interior (or interior chamber) of stem 30. FIG. 1 illustrates a series of opposing pairs of apertures 34 interspersed with a series of opposing pairs of apertures 36 which are offset 90° from pairs 34 and interspersed heightwise between opposing pairs 34. In FIG. 1 there are five opposing pairs of apertures 34 and four opposing pairs of apertures 36. The presence of the plurality of apertures 34 and 36 in lower portion 44 of stem 30 enables greater access by various crawling insects to the hollow interior of stem 30 as well as providing better distribution of the smell of bait 14. The presence of multiple pairs enables light breezes to move through stem 30 drawing out odors from within container 12 through apertures 32 through the hollow interior or interior chamber of stem 30 and out of apertures 34 and 36. By having apertures at 90° offsets, wind from multiple directions is able to be taken advantage of. Multiple offsets also provide a greater number of entries and angles for crawling insects to find and crawl in to head for and obtain bait 14. Again, while the apertures 34 and 36 in FIG. 1 are in opposing pairs, this is primarily due to simplicity of construction, and while useful it is not a requirement for proper functioning of baiting device 10. Further, while somewhat less effective, even a single aperture or hole 34 or 36 would be adequate to provide access to insects from the neighboring environment to get to bait 14 within container 12. A plurality of apertures is preferred.

Grounded portion 46 in stem 30 is that portion that is inserted within the ground in order to support and hold baiting device 10. In this manner, stem 30 is used as a stake being driven into the ground preferably to a point somewhere just a little bit below the lowest of apertures 34 or 36 so that crawling insects need only crawl up the stem a short way before having access to the hollow interior of stem 30. It is preferable not to drive the stake into the ground above the lowest of apertures in order to prevent loose dirt from clogging some of the apertures or falling within the interior of stem 30. To assist in insertion of stem 30 into the ground the bottom of stem 30 is an angled portion (or angled end) 40, again making stem 30 effectively an angled stake. Although not required and not present in the preferred embodiment, a plastic plug 38 may be used within the grounded portion 46 of stem 30 to prevent dirt from rising up through the hollow interior of stem 30 and interfering with access through apertures 34 and 36. In fact, the ground is typically sufficiently solid to form a plug of its own which may be knocked out upon removal of baiting device 10. In either event, insects are extremely unlikely, and generally completely unable, to enter the interior of stem 30 from underneath because of either plug 38 or the expected packed portion of ground similarly positioned.

FIG. 2 is an exploded version of the more complex embodiment of baiting device 10. The preferred fastener 22 is a hex screw requiring hex tool 50 to screw into place through lid 18 and cap 20. The threads of fastener 22 pass through lid 18 and interact with cap 20. While cap 20 is illustrated exploded away from upper portion 42 of stem 30, preferably cap 20 is permanently or semi-permanently affixed to upper portion 42. This embodiment uses plug 38 within the hollow interior of stem 30 above angled end 40. Plug 38 defines the bottom of the interior chamber, while cap 20 defines the top and stem 30 defines the surrounding side walls.

Figure 3:
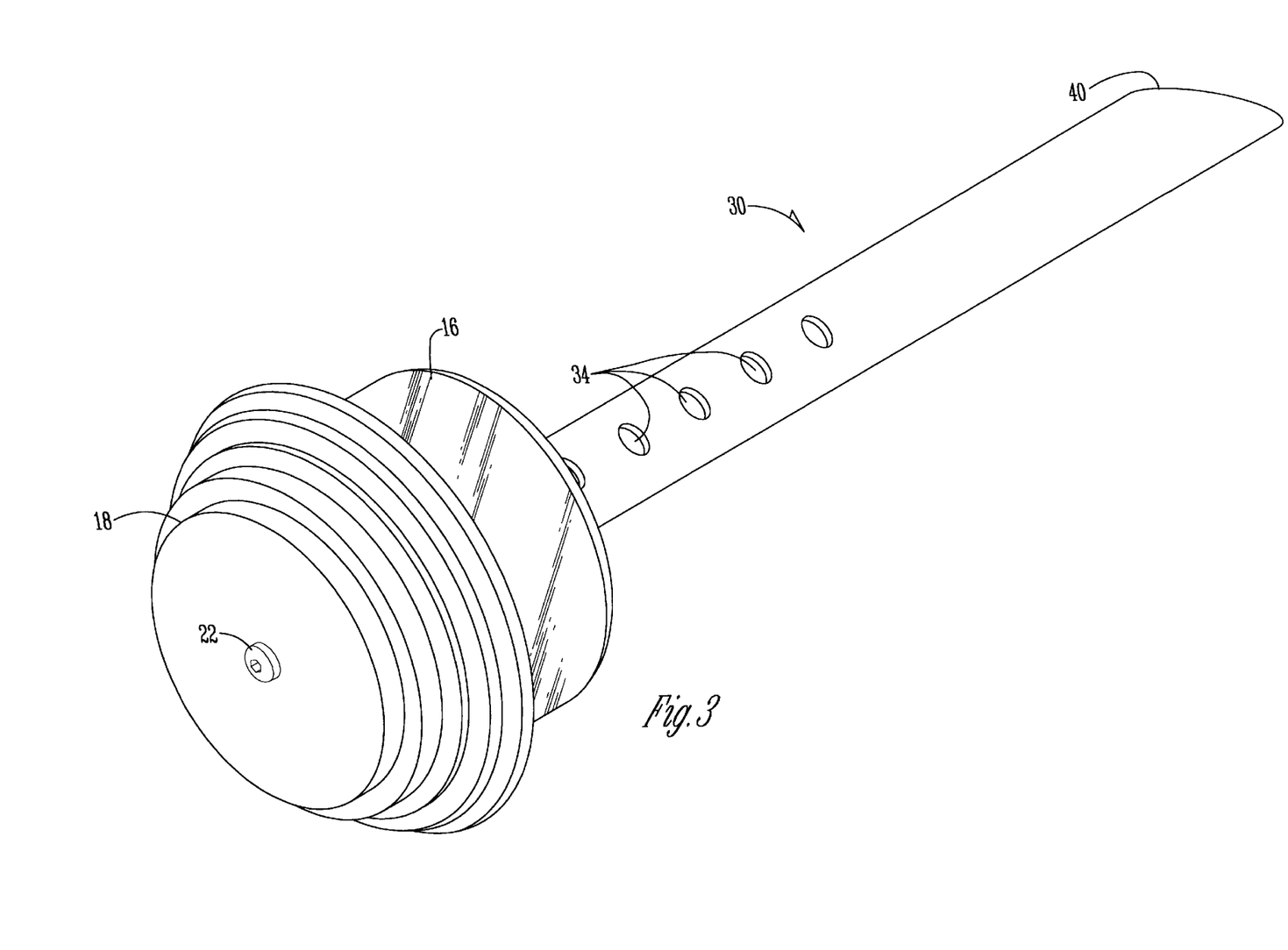
FIG. 3 is an angled perspective view of the preferred embodiment of the baiting device.

FIGS. 3–9 provide a complete series of views of the simpler preferred embodiment of baiting device 10. The simpler preferred embodiment has fewer apertures 34 & 36, no plug 38, and no washer 24. FIG. 3 is a perspective view from slightly above and in front of baiting device 10 of the preferred embodiment of baiting device 10.

Figure 4:
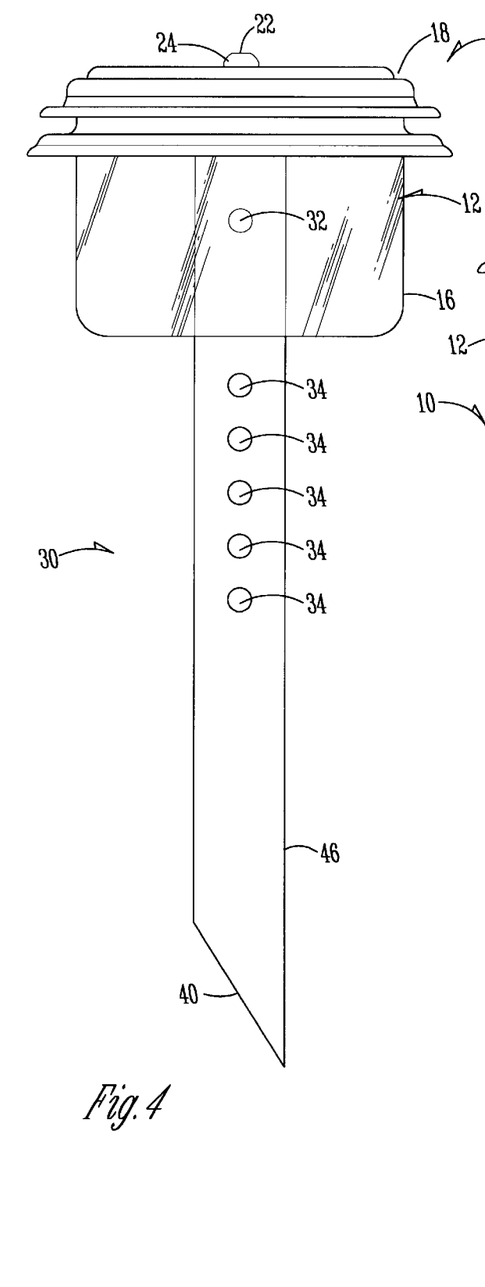
FIG. 4 is a straight on view of the preferred embodiment of the baiting device.

FIG. 4 is a straight on view of the preferred embodiment of baiting device 10. Lower portion 44 of stem 30 has five opposing pairs of apertures 34 outside of container 12 and no apertures 36 at 90 degree displacements. Upper portion 42 within container body 16 has a pair of opposing apertures 32. Fastener 22 has no washer 24.

Figure 5:
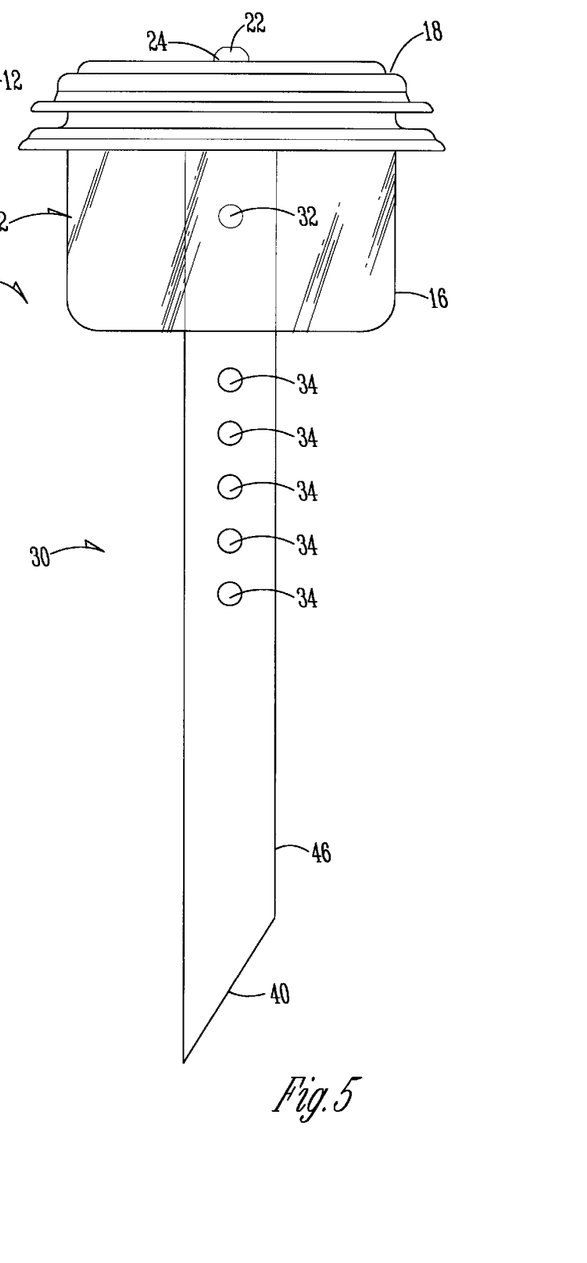
FIG. 5 is a straight on view of the preferred embodiment of the baiting device from the opposite side of FIG. 4.
Figure 6:
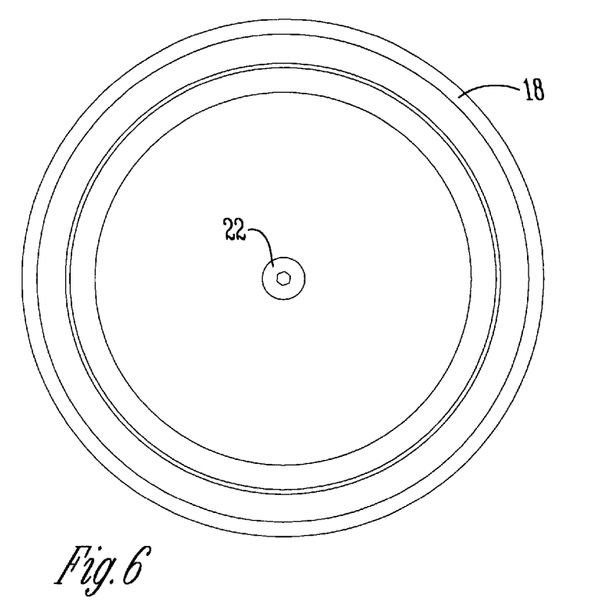
FIG. 6 is a top down view of the preferred embodiment of the baiting device.
Figure 7:
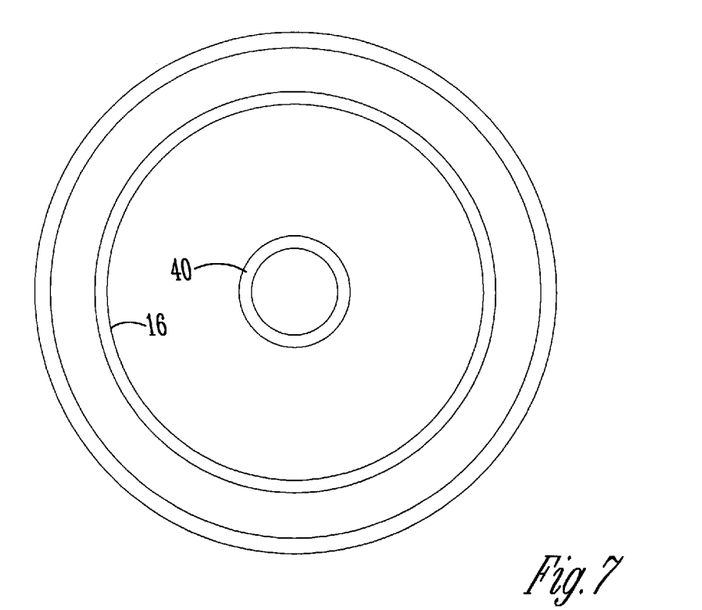
FIG. 7 is a bottom up view of the preferred embodiment of the baiting device.
Figures 8, 9:
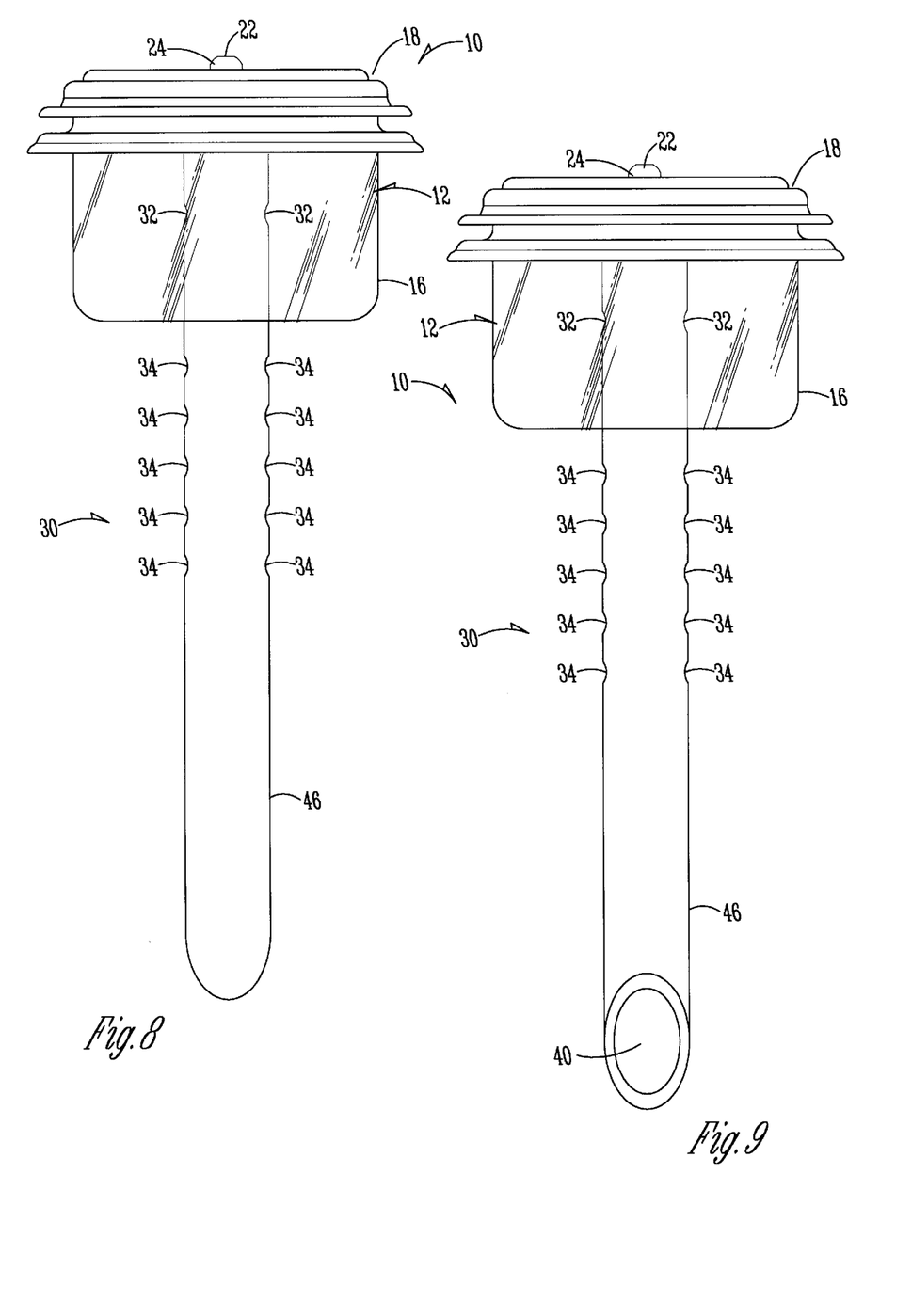
FIG. 8 is a straight on view of the preferred embodiment of the baiting device viewed 90 degrees from the view of FIG. 4.
FIG. 9 is a straight on view of the preferred embodiment of the baiting device from the opposite side of FIG. 8.

FIG. 5 is a straight on view of the preferred embodiment of baiting device 10 from the opposite side of FIG. 4. FIG. 6 is a top down view of the preferred embodiment of baiting device 10 including fastener 22 and resealable lid 18. FIG. 7 is a bottom up view of the preferred embodiment of baiting device 10 including angled end 40 and the hollow interior, container body 16, and resealable lid 18. FIG. 8 is a straight on view of the baiting device viewed 90 degrees from the view of FIG. 4. FIG. 9 is a straight on view of the preferred embodiment of baiting device 10 from the opposite side of FIG. 8. Only five opposing pairs of apertures 34 and one opposing pair of apertures 32 are present in the preferred embodiment. Although not visible in the perspectives chosen, cap 20 is present in the preferred embodiment of baiting device 10, but the bottom of cap 20 is above the bottom of lid 18 hiding cap 20 from view.

The preferred method of use of baiting device 10 follows. A suitable bait 14 for the insects to be treated is selected. In treatment of fire ants, Max Force (tm) is a preferred bait 14. Bait 14 is placed inside of container body 16 and resealable lid 18 is snapped into place. Fastener 22 is then used to lock resealable lid 18 into position against cap 20. Baiting device 10 is then staked into the ground (or grounded) at a site to be protected or near a ant hill or insect location to be treated. Typically baiting device 10 is not inserted into the ant hill itself, but rather at a location where the ants are going or will pass by while looking for food or other forage. Grounded portion 46 of stem 30 is inserted into the ground using angled end 40 to lead into the ground. Stem 30 is preferably inserted to a depth where the ground rises to slightly below the lowest of apertures 34 in lower portion 44 of stem 30.

As a result of the absence of direct contact (or direct communication) between the neighboring environment and bait 14 inside container 12 the bait does not become damp, get blown away, or get eaten or moved by birds, small animals, or children. Even though rain or other moisture may enter apertures 34 (or apertures 36 if present), gravity should prevent significant quantities from rising up and through apertures 32 into the inside of container 12 where it can reach bait 14. Children and small animals and birds could only get into the bait primarily by the difficult task of shearing into plastic container 12 or unlocking and then unsnapping lid 18, where more direct contact might make it simpler to knock bait out simply by moving the baiting device until the bait fell out of the openings directly in the container. The configuration of the present invention providing indirect access to an otherwise sealed container holding the bait should provide improved performance both in protecting the bait from the elements and from accidental ingestion or interference with children or small animals. The improved protection allows for more extended periods of effectiveness for a given amount of bait.

The indirect contact (or indirect communication) between bait 14 and the environment through the hollow interior of stem 30 by way of apertures 32 and 34 (and apertures 36 if present) allows the odor of the bait to enter the environment and allows access to ants and other crawling insects to follow such odors and get to and remove portions of the bait. Ants for example would: smell the airborne odors; climb up the outer surface of stem 30; enter the hollow interior by way of an aperture 34 or 36; climb up inner surface of stem 30; exit the hollow interior by way of an aperture 32 into the inside of container 12; crawl down the outer surface. of the upper portion 42 of stem 30 within container 12 until they reach bait 14. After obtaining bait 14 the ants would retrace their steps and return to their ant hill carrying the bait with them.

An individual could quickly check the status of bait 14 by walking by and examining the level of bait 14 remaining through the transparent walls of container body 16 (alternatively, no translucent walls could also provide a sufficient view to check the level of bait), without need to remove baiting device 10 or to open container 12. If bait levels are running low, additional bait may be added either by unlocking and unsnapping lid 18 while baiting device 10 remains in the ground, or by removing baiting device 10 and accomplishing the same task for several baiting devices 10 at a common time and location. The baiting devices 10 of the present invention are relatively inconspicuous and not unattractive and may be distributed at strategic points to protect a house, garden, flower bed, etc. without attracting undue attention. Baiting devices 10 may also be placed in an area and then easily moved to different locations as needs change.

The above description relates to two modes of the invention including the preferred mode. Variations and additional features and functions within the skill of the art are intended to be covered.

I claim:

1. A baiting device comprising:
   a hollow stem having an upper portion, a lower portion, and an interior chamber;
   a container mounted around said upper portion of said hollow stem having an open portion and having a wall with an aperture filled by said upper portion of said stem;
   a resealable lid mounted to seal said open portion of said container resulting in effective sealing of the inside of said container against direct exposure to the neighboring environment;

said upper portion of said stem positioned inside of said container;

said upper portion of said stem having at least one aperture communicating between said inside of said container and said interior chamber of said stem;

said lower portion of said stem positioned outside of said container;

said lower portion of said stem having a plurality of apertures communicating between said interior chamber of said stem and said neighboring environment;

said interior chamber of said stem providing indirect communication between said inside of said container and said neighboring environment;

a cap attached to the top of said upper portion of said stem positioned inside said container;

a fastener affixing said resealable lid to said cap.

2. The baiting device of claim 1 further comprising: a washer interposed between said fastener and said lid.

3. A device for inserting into the ground and holding bait for treating crawling insects comprising:

a stem having a hollow interior, the stem having an overall length, an upper portion, a lower portion, and an exposed intermediate portion, the lower portion comprising approximately one-quarter to one-third of the overall length and being insertable into the ground;

the upper portion and the intermediate portion each having at least one generally horizontal aperture extending into the hollow interior for providing crawling insects access into the hollow interior of the stem, the lower portion of the stem being adapted to be inserted in the ground and being free of horizontal apertures;

a cup-shaped container having an interior for holding bait and an upwardly directed open top, the container being mounted on the stem so as to surround the upper portion of the stem in a horizontal plane;

a lid sealingly covering the open top of the container so as to prevent the bait from leaking out the open top;

the upper portion of the stem having an end mounted to the lid so as to prevent the bait from entering the hollow interior of the stem through the end of the upper portion;

the at least one aperture in the upper portion of the stem being in communication with the interior of the container so as to provide a pathway for the crawling insects to access and remove the bait from the container.

4. The device of claim 3 further comprising a plug defining a bottom of said hollow interior of said stem at a point in the lower portion of the stem.

5. The device of claim 3 wherein said at least one aperture in said upper portion of the stem is at least a pair of apertures; and said at least one aperture in the exposed intermediate portion of the stem is a plurality of pairs of apertures.

6. The device of claim 5 wherein the plurality of pairs of apertures in said exposed portion of said stem are longitudinally spaced along said stem and extend crosswise to each other.

7. The device of claim 3 further comprising insect bait disposed within said interior of said container at a level below said at least one aperture in said upper portion of the stem.

8. The device of claim 3 wherein:

the container is at least partially translucent.

9. The device of claim 3 wherein:

the container is at least partially transparent.

10. The device of claim 9 further comprising:

insect bait disposed within the interior of the container so as to be visible through the partially transparent portion of the container.

11. A device for inserting into the ground and holding bait for treating crawling insects comprising:

a container having a cavity therein for holding bait;

a stem having a hollow interior, the stem having an overall length, an upper portion, a lower portion, and an exposed intermediate portion, the lower portion comprising approximately one-quarter to one-third of the overall length and being insertable into the ground;

the upper portion of the stem being disposed in the container, the upper portion and the intermediate portion each having at least one generally horizontal aperture extending into the hollow interior for providing crawling insects access into the hollow interior of the stem, the lower portion of the stem being adapted to be inserted in the ground and being free of horizontal apertures;

the apertures in the intermediate portion of the stem, the hollow interior, and the apertures in the upper portion of the stem being in communication so as to provide a pathway for the crawling insects to access and remove the bait from the container.

* * * * *